(12) United States Patent
Almeida et al.

(10) Patent No.: US 10,194,589 B2
(45) Date of Patent: Feb. 5, 2019

(54) MULTI-ROW SUGARCANE HARVESTER FEED SECTION

(71) Applicant: Deere & Company, Moline, IL (US)

(72) Inventors: Kent M. Almeida, Napoleonville, LA (US); Beau Downey, Gonzales, LA (US)

(73) Assignee: DEERE & COMPANY, Moline, IL (US)

( * ) Notice: Subject to any disclaimer, the term of this patent is extended or adjusted under 35 U.S.C. 154(b) by 9 days.

(21) Appl. No.: 15/387,848

(22) Filed: Dec. 22, 2016

(65) Prior Publication Data
US 2018/0177130 A1    Jun. 28, 2018

(51) Int. Cl.
*A01D 45/10* (2006.01)
*A01D 57/00* (2006.01)
*A01D 43/08* (2006.01)

(52) U.S. Cl.
CPC ............ *A01D 57/00* (2013.01); *A01D 43/08* (2013.01); *A01D 45/10* (2013.01)

(58) Field of Classification Search
CPC ........ A01D 57/00; A01D 43/08; A01D 45/10; A01D 17/00; A01D 17/02; A01D 17/04; A01D 17/06; A01D 19/02; A01D 21/04; A01D 25/04; A01D 25/042; A01D 25/044; A01D 27/04; A01D 33/02; A01D 33/04
See application file for complete search history.

(56) References Cited

U.S. PATENT DOCUMENTS

| 3,350,865 | A | * | 11/1967 | Ashton | A01D 41/14 56/119 |
| 3,665,686 | A |   | 5/1972 | Duncan | |
| 4,215,527 | A | * | 8/1980 | Shriven | A01D 43/082 56/98 |
| 4,386,492 | A | * | 6/1983 | Tilby | A01D 45/10 56/13.9 |
| 5,157,904 | A | * | 10/1992 | Otten | A01D 45/10 56/14.3 |
| 5,816,036 | A |   | 10/1998 | Caillouet | |

(Continued)

FOREIGN PATENT DOCUMENTS

BR    PI0709365-9 A2    7/2011
BR    PI1105639-8 A2    6/2016
(Continued)

OTHER PUBLICATIONS

Images of Two-Row Sugarcane Harvester (2 pages) (prior art before Dec. 22, 2016).

*Primary Examiner* — Alicia Torres
*Assistant Examiner* — Adam J Behrens

(57) ABSTRACT

A feed section for a multi-row sugarcane harvester comprises a first feed train configured to advance a first mat of sugarcane received from a first row of sugarcane, a second feed train configured to advance a second mat of sugarcane received from a second row of sugarcane, and a third feed train. The first and second feed trains merge into the third feed train. Each of the first feed train and the second feed train comprises a first feed roller and a second feed roller, each of which has an axis of rotation. With respect to the first feed train, the axes of rotation of the first and second feed rollers are positioned at different acute angles relative to a fore-aft axis of the feed section.

12 Claims, 6 Drawing Sheets

(56) References Cited

U.S. PATENT DOCUMENTS

| | | | |
|---|---|---|---|
| 6,062,009 A | 5/2000 | Caillouet | |
| 2014/0174048 A1* | 6/2014 | Lawson | A01D 45/003 56/13.9 |
| 2015/0331408 A1 | 11/2015 | Richard | |
| 2017/0000026 A1* | 1/2017 | Seki | A01D 45/10 |
| 2017/0280626 A1* | 10/2017 | Bertino | A01D 34/416 |

FOREIGN PATENT DOCUMENTS

| | | | |
|---|---|---|---|
| WO | 2007140520 A1 | 12/2007 | |
| WO | WO-2007140520 A1 * | 12/2007 | A01D 45/10 |

* cited by examiner

MULTI-ROW SUGARCANE HARVESTER FEED SECTION

FIELD OF THE DISCLOSURE

The present disclosure relates to a multi-row sugarcane harvester, and, more particularly, to a feed section therefor.

BACKGROUND OF THE DISCLOSURE

A sugarcane harvester comprises a feed section for feeding a severed mat of sugarcane from a basecutter to a chopping section where the sugarcane stalk is cut into segments called "billets." The feed section has a plurality of feed rollers for feeding the mat toward the chopping section.

SUMMARY OF THE DISCLOSURE

According to an aspect of the present disclosure, a feed section for a multi-row sugarcane harvester is disclosed. The harvester is configured to harvest a first row of sugarcane and a second row of sugarcane simultaneously. The feed section comprises a first feed train configured to advance a first mat of sugarcane received from the first row of sugarcane, a second feed train configured to advance a second mat of sugarcane received from the second row of sugarcane, and a third feed train. The first and second feed trains merge into the third feed train. The third feed train is configured to advance the first and second mats received respectively from the first and second feed trains. Each of the first feed train and the second feed train comprises a first feed roller and a second feed roller. Each of the first and second feed rollers has an axis of rotation. With respect to the first feed train, the axes of rotation of the first and second feed rollers are positioned at different acute angles relative to a fore-aft axis of the feed section. The axes of rotation of the first and second feed rollers of the second feed train may also be positioned at different acute angles relative to the fore-aft axis. It is to be understood that the feed section may be configured for use with two or more rows of sugarcane.

According to another aspect of the present disclosure, in one or both of the first and second feed trains, the axis of rotation of the first feed roller forms an acute angle relative to the fore-aft axis, and the axis of rotation of the second feed roller is positioned downstream from the first feed roller in a feed direction toward the third feed train and forms a more acute angle relative to the fore-aft axis, promoting a smooth transition of the sugarcane mat(s) toward the third feed train.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
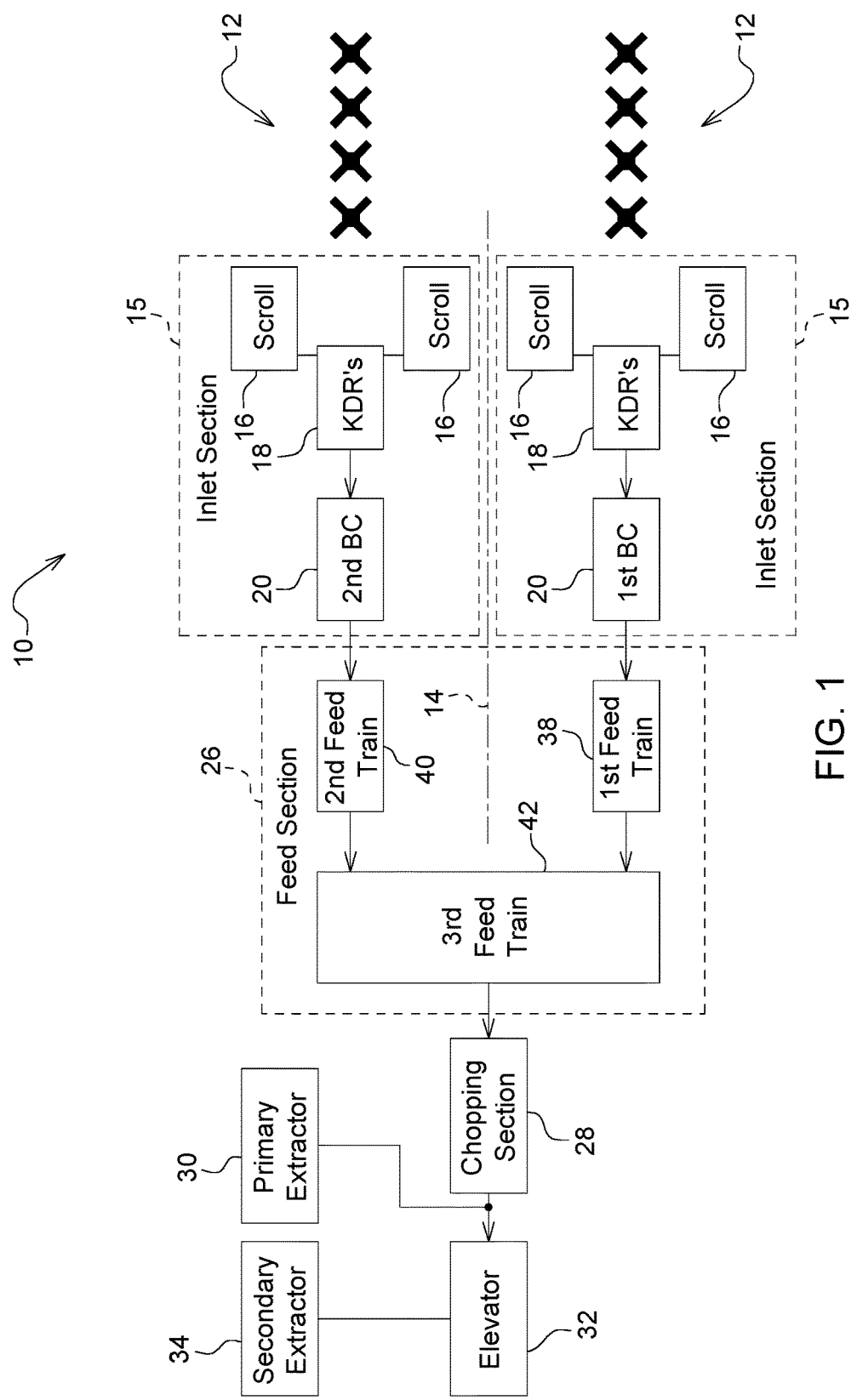
FIG. 1 is a diagrammatic view showing a multi-row sugarcane harvester.

Referring to FIG. 1, a multi-row sugarcane harvester 10 is configured to harvest a first row 12 of sugarcane and a second row 12 of sugarcane simultaneously. The harvester 10 is configured to process the harvested sugarcane into billets.

The harvester 10 has a fore-aft axis 14 and comprises an inlet section 15 for each row 12. Each inlet section 15 comprises relative to the fore-aft axis 14 a laterally outer crop divider scroll 16 and a laterally inner crop divider scroll 16. The scrolls 16 are configured to lift sugarcane stalks before being severed. The harvester 10 may also comprise a separator scroll (not shown) for each row 12 laterally outward from the respective scroll 16, such separator scroll being configured to separate an adjacent row of uncut sugarcane from the respective row to be cut.

Figure 2:
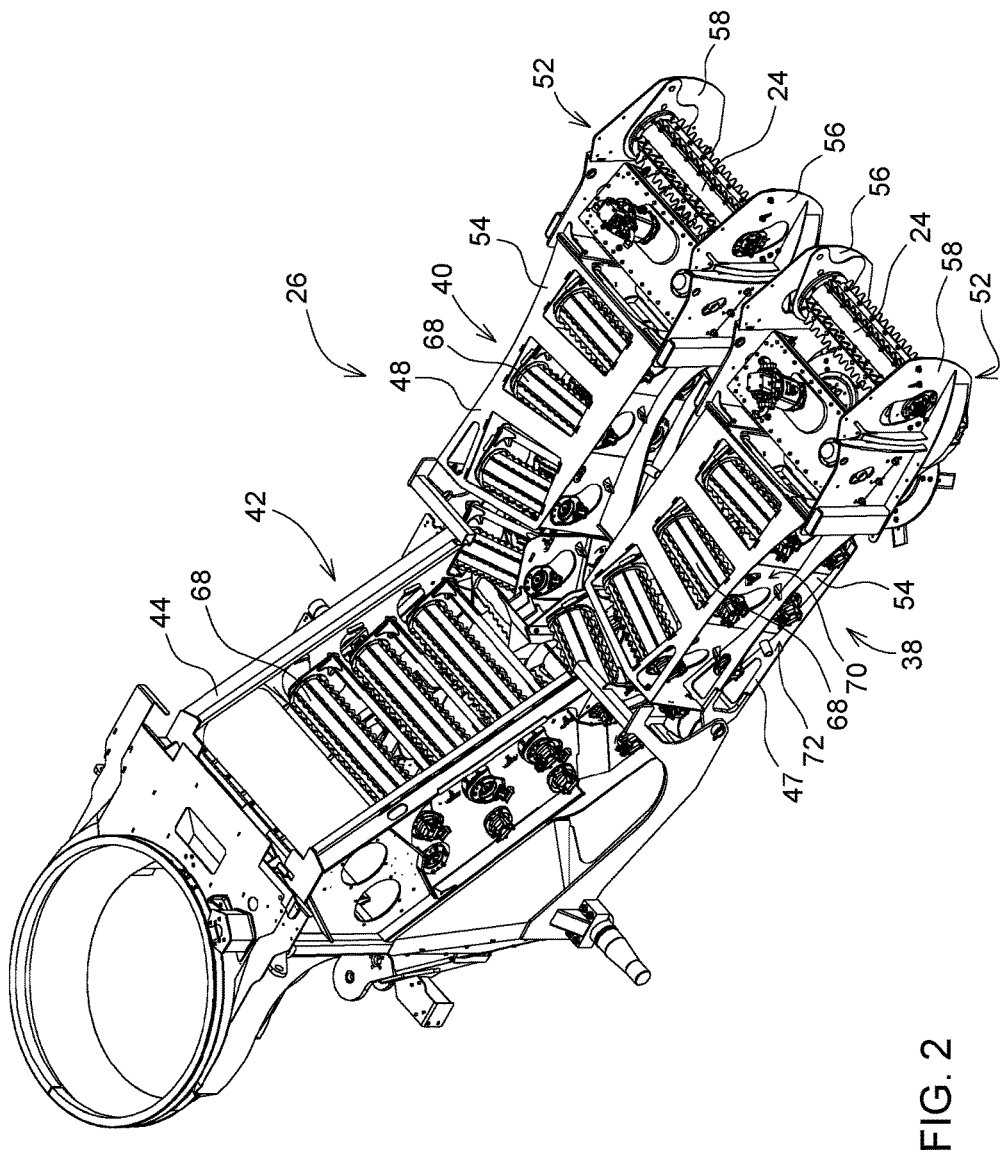
FIG. 2 is a perspective view showing the feed section comprising a first feed section, a second feed section, and a third feed section into which the first and second feed sections merge, the feed section comprising an upper rank of feed rollers and a lower rank of feed rollers.

Each inlet section 15 comprises a set 18 of knockdown rollers and a basecutter 20. Each set 18 comprises an upper knockdown roller (not shown) and a lower knockdown roller 24 (FIG. 2). The set 18 is positioned ahead of the basecutter 20 and configured to lean the sugarcane over enough to expose the base of the stalk to the basecutter 20. Each basecutter 20 comprises a pair of counter-rotating cutting disks driven by a motor (e.g., hydraulic motor shown, for example, in FIG. 2) and comprising knives spaced about their periphery. The cutting disks cooperate with one another to sever the sugarcane stalk at the base thereof near the ground. The harvester 10 may comprise a single topper (not shown) for both rows 12 or one topper (not shown) for each row 12 to cut off leafy material from the sugarcane before engagement with the knockdown roller sets 18.

The harvester 10 comprises a feed section 26, a chopping section 28, a primary extractor 30, an elevator 32, and, in some embodiments, a secondary extractor 34. The feed section 26 is configured to receive from each basecutter 20 a mat of severed sugarcane and to feed the mats rearwardly and merge them into a single mat. The chopping section 28 is configured to receive the merged mat from the feed section 26 and cut the sugarcane stalk into billets. The primary extractor 30 is positioned downstream from the chopping section 28 and is configured to separate crop residue (e.g., leafy material) from the billets and remove that crop residue from the harvester 10. The elevator 32 is positioned at the rear of the harvester 10 to receive the cleaned flow of billets and is configured to convey the billets to an elevated position where they are discharged into a wagon to be hauled away. The secondary extractor 34 (if present) is positioned near the top of the elevator 32 and is configured to separate further crop residue from the billets and remove the crop residue from the harvester 10.

The harvester 10 comprises an operator's station (not shown) and traction elements (not shown). A human operator can operate the harvester 10 from an operator's station.

The traction elements are positioned on opposite sides of the harvester 10 for engaging the ground and propelling the harvester 10. Each traction element may be, for example, a track unit or a ground-engaging wheel (e.g., one track unit on each side of the left and right sides of the harvester 10).

Figure 3:
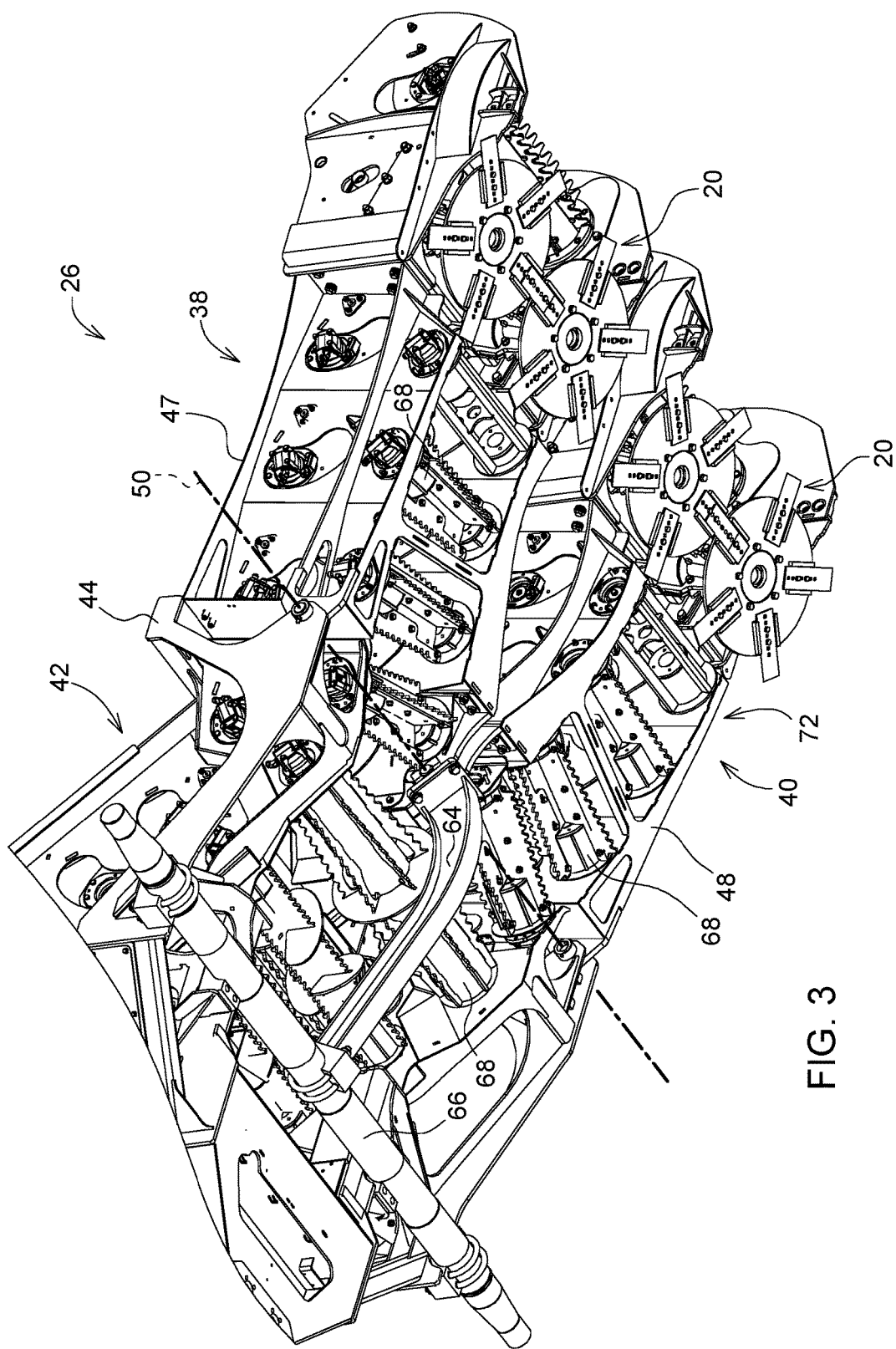
FIG. 3 is a perspective view showing an underside of the feed section.

Referring to FIGS. 2 and 3, the feed section 26 comprises a first feed train 38, a second feed train 40, and a third feed train 42. The first feed train 38 is configured to advance a first mat of sugarcane received from the first row 12 of sugarcane in a first feed direction toward the third feed train 42. The first basecutter 20 is configured to sever the first mat, and the first feed train 38 is configured to receive the severed first mat from the first basecutter 20 into a mouth of the first feed train 38 such that the first basecutter 20 is positioned between the first set 18 of knockdown rollers and the mouth of the first feed train 38. The second feed train 40 is configured to advance a second mat of sugarcane received from the second row 12 of sugarcane in a second feed direction toward the third feed train 42. The second basecutter 20 is configured to sever the second mat, and the second feed train 40 is configured to receive the severed second mat from the second basecutter 20 into a mouth of the second feed train 40 such that the second basecutter 20 is positioned between the second set 18 of knockdown rollers and the mouth of the second feed train 40. The first and second feed trains 38, 40 merge into the third feed train 42. The third feed train 42 is configured to advance the first and second mats received respectively from the first and second feed trains 38, 40 to the chopping section 28.

The harvester 10 comprises a frame 44, a first frame 47, and a second frame 48. The frame 44 is, for example, the main frame of the harvester 10. The first and second frames 47, 48 are coupled pivotally to the frame 44 for pivotal movement about a pivot axis 50 in response to operation of respective actuators (e.g., hydraulic cylinders).

Each of the first frame 47 and the second frame 48 comprises a frame inlet portion 52 included in the respective inlet section 15 and a frame feed portion 54 included in the respective feed train 38, 40. Mounted to the frame inlet portion 52 are a respective basecutter 20 and a respective lower knockdown roller 24. The basecutter 20 and the lower knockdown roller 24 are mounted to (e.g., bolted) and between a first side wall 56 of the frame inlet portion 52 and a second side wall 58 of the frame inlet portion 52. The basecutter 20 and the lower knockdown roller 24 are mounted to the frame inlet portion 52 in that their axes of rotation are stationary relative thereto.

The frame inlet portion 52 is coupled to the frame feed portion 54. The first and second side walls 56, 58 are fixed (e.g., bolted) to the feed portion 54.

Figure 4:
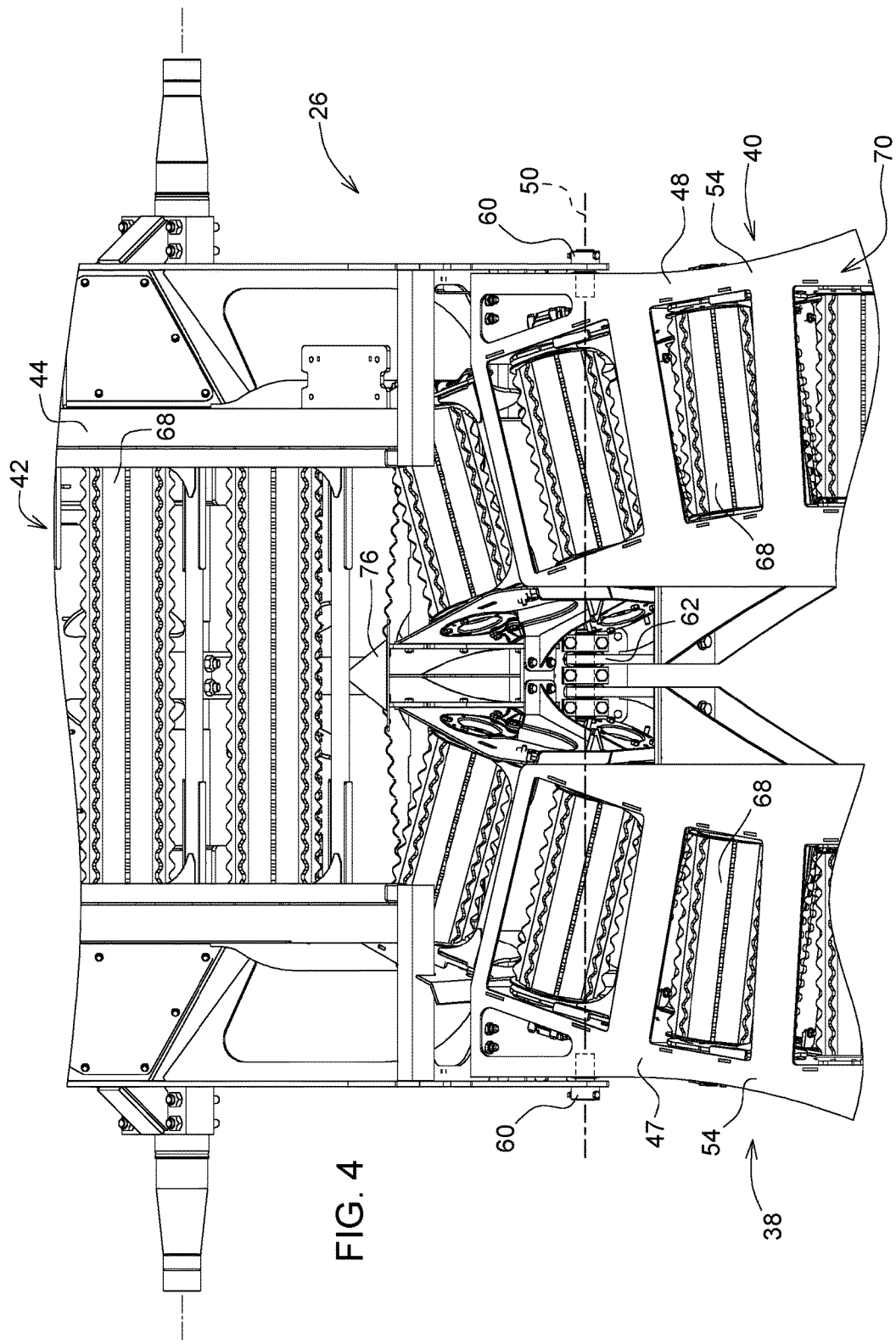
FIG. 4 is a front view showing a first and a second frame of the harvester coupled pivotally to another frame (e.g., main frame) of the harvester for pivotal movement about a pivot axis for corresponding movement of basecutters of the inlet section.

Referring to FIG. 4, the frame feed portions 54 are coupled pivotally to the frame 44. The frame feed portions 54 are coupled pivotally to the frame 44 laterally outwardly at a respective side pivot joint 60 (e.g., pinned joint) and a common center pivot joint 62 (e.g., pinned joint). The basecutter 20 is thus coupled to the frame 44 for pivotal movement about the pivot axis 50 in response to operation of the respective actuator such that the basecutter 20 may be raised or lowered to accommodate row profile variation in order to sever the sugarcane at its base. In other embodiments, the first and second frames 47, 48 are fixed to the frame 44, and may thus be formed as part of the frame 44.

Referring to FIG. 3, a beam 64 is fixed to the center pivot joint 62 and the housing of a drive axle 66 to transmit load from the joint 62 to the axle 66, the housing of which is fixed to the frame 44. The center pivot joint 62 comprises a frame side included in the frame 44. The beam 64 is fixed (e.g., bolted) to the frame side of the joint 62. The beam 64 is curved to pass under the third feed train 42.

Referring back to FIGS. 2 and 3, the feed section 26 comprises feed rollers 68 driven to advance the sugarcane to the chopping section 28. The feed rollers 68 in each feed train 38, 40, 42 are arranged in an upper rank 70 of feed rollers 68 and a lower rank 72 of feed rollers 68. Each of the first and second feed trains 38, 40 comprises, for example, four feed rollers 68 in each rank 70, 72, and the third feed train 42 comprises, for example, three feed rollers 68 in the upper rank 70 and four feed rollers 68 in the lower rank 72.

Each feed roller 68 has an axis of rotation 74 about which the feed roller 68 is rotatable. Each feed roller 68 is driven to rotate about its axis 74 by a respective motor, which is a hydraulic motor, although in other embodiments it could take the form of, for example, an electric motor or other suitable drive device.

Each feed roller 68 is mounted to one of the frames 44, 47, 48. With respect to each of the first and second feed trains 38, 40, the first three feed rollers 68 of each of the upper rank 70 and the lower rank 72 (starting from the front near the respective basecutter 20) are mounted to the respective frame 47, 48 so as to pivot therewith about the pivot axis 50, and the fourth feed rollers 68 of each of the upper rank 70 and the lower rank 72 (i.e., the feed rollers 68 closest to the third feed train 42) are mounted to the frame 44 so as not to pivot about the pivot axis 50. With respect to the third feed train 42, the feed rollers 68 of the upper rank 70 and the lower rank 72 are mounted to the frame 44 so as not to pivot about the pivot axis 50.

The feed rollers 68 of the lower rank 72 are mounted to the respective frame 44, 47, 48 such that their axes of rotation 74 are stationary relative to that frame 44, 47, 48. The feed rollers 68 of the upper rank 40 are pivotally coupled to the respective frame 44, 47, 48 in order to pivot about a respective pivot axis relative to that frame 44, 47, 48 in response to the size of the mat passing between the upper and lower ranks 70, 72. The feed rollers 68 of the upper rank 70 are biased by gravity to assume their lowest position within their pivot range, and to pivot upwardly in response to larger mat sizes. As such, the axes of rotation 74 of the feed rollers 68 of the upper rank 70 are pivotable relative to the respective frame 44, 47, 48.

Figure 5:
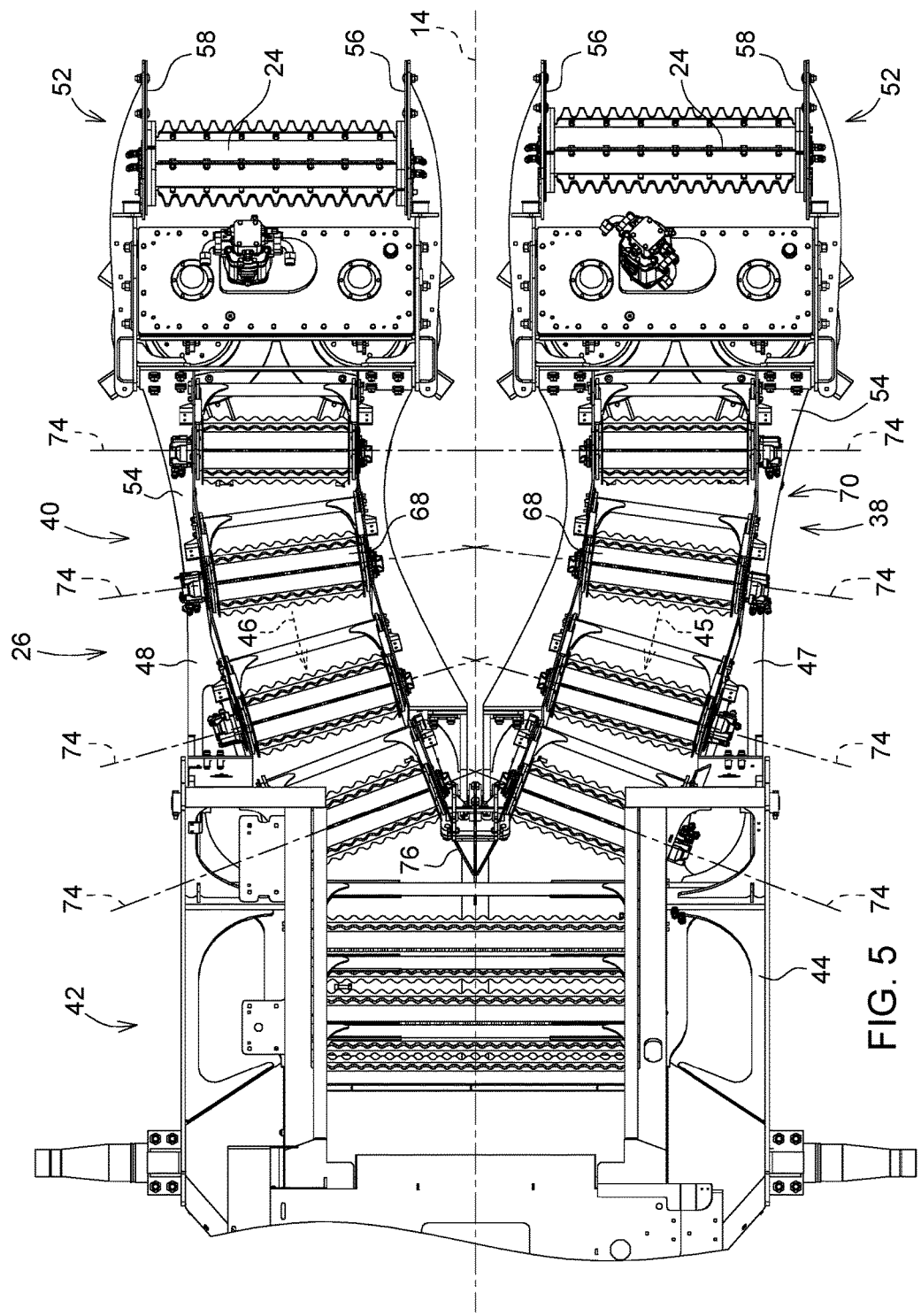
FIG. 5 is a top plan view showing the upper rank of feed rollers (the lower rank of feed rollers omitted from this view) with axes of rotation in the first and second feed trains progressively acutely angling to promote a smooth transition of the sugarcane mat toward the third feed train.
Figure 6:
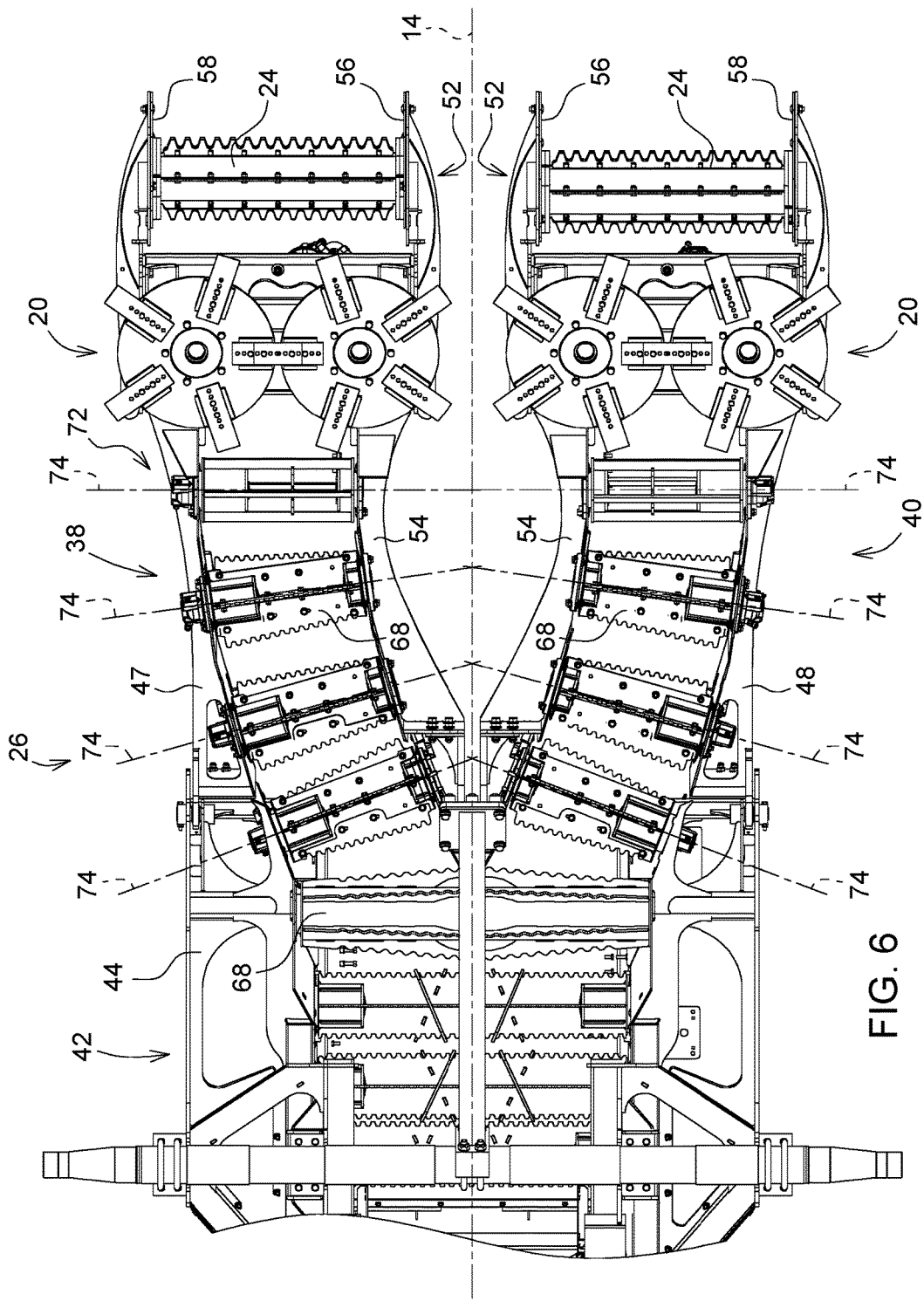
FIG. 6 is a bottom view showing the lower rank of feed rollers (the upper rank of feed rollers omitted from this view) with axes of rotation in the first and second feed trains similarly progressively acutely angling.

Referring to FIGS. 5 and 6, illustratively the first and second feed trains 38, 40 are symmetrical relative to the fore-aft axis 14. The fore-aft axis 14 is, for example, a fore-aft axis and centerline of the harvester 10 and the feed section 26.

Referring momentarily to FIGS. 2 and 3, with respect to each of the first and second feed trains 38, 40, each feed roller 68 of the upper rank 70 is paired with a feed roller 68 of the lower rank 72. The axes of rotation 74 of the feed rollers 68 of a given pair of feed rollers 68 are positioned at the same angle relative to the fore-aft axis 14.

Referring again to FIGS. 5 and 6, the first and second feed trains 38, 40 illustratively exhibit a progressive angling of axes 74 relative to the fore-aft axis 14 in the respective feed direction 45, 46 toward the third feed train 42. Such progressive angling promotes a smooth transition of the sugarcane mats toward the third feed train 42 so as to reduce the potential for sugarcane damage and losses that might result from an abrupt transition due to an extreme angle between axes of rotation of adjacent pairs of feed rollers. Instead, the angle difference between the axes 74 of the first pair of feed rollers 68 and the axes 74 of the final pair of feed rollers 68 is spread across a number of feed roller pairs. The axes of rotation 74 of the first pair of feed rollers 68 (closest to the respective basecutter 20) are, for example, perpendicular to the fore-aft axis. The other pairs of feed rollers 68 are positioned downstream from the first pair of feed rollers 68 in the respective feed direction 45, 46 toward the third feed train 42.

With respect to the other pairs of feed rollers 68 in the first and second feed trains 38, 40, the axes of rotation 74 are positioned at different acute angles relative to the fore-aft axis 14. Illustratively, the axes of rotation 74 of the pairs of feed rollers 68 are progressively acutely angled relative to the fore-aft axis 14 in the respective feed direction 45, 46 toward the third feed train 42. As such, the axes of rotation 74 form angles of increasing acuteness relative to the fore-aft axis 14 in the respective feed direction 45, 46.

With respect to the third feed train 42, the feed rollers 68 are centered on the fore-aft axis. The axes of rotation 74 of the feed rollers 68 are perpendicular to the fore-aft axis 14.

The configuration of the feed rollers 68 may vary depending, for example, on the position of a given feed roller 68 within the feed section 26. The feed rollers 68 of the first and second feed trains 38, 40 may be configured in a variety of ways to shift the first and second mats of sugarcane toward the third feed train 42, including, for example, vertical, spiraled, and tapered feed rollers 68.

The feed rollers 68 of the upper rank 70 of the first and second feed trains 38, 40 are similar to one another in configuration, and the feed rollers 68 of the upper rank 70 of the third feed train 42 are similar to one another in configuration.

With respect to the feed rollers 68 of the upper rank 70 and the first feed roller 68 of the lower rank 72 of the third feed train 42 (the one positioned immediately adjacent to a junction 76 at which the first and second feed trains 38, 40 merge into the third feed train 42), the feed roller 68 comprises axial rows of teeth spaced circumferentially evenly about a drum of the feed roller 68 (the roller 68 comprising a single drum), each row of teeth formed as a linear plate of teeth mounted to the drum (e.g., welded). With respect to each feed roller 68 of the upper rank 70, the profile of the radial height of the peaks of the teeth relative to the respective axis 74 ("tooth height profile") is uniform. Each axial row of teeth is configured to have the uniform tooth height profile of the respective feed roller 68 of the upper rank 70.

With respect to the first feed roller 68 of the lower rank 72 of the third feed train 42, the feed roller 68 radially bulges axially centrally relative to its axis of rotation 74. For example, the tooth height profile radially bulges axially centrally relative to the axis 74. Each axial row of teeth is configured to have such a tooth height profile.

With respect to the feed rollers of the lower rank 72 of the first and second feed trains 38, 40, each feed roller 68 comprises two coaxial drums 44 spaced along the respective axis 74 so as to be positioned at opposite end portions of the feed roller 68. The first feed roller 68 of the lower rank 72 of each of the first and second feed trains 38, 40 is called a butt lifter because it is configured to lift the sugarcane severed by the respective basecutter 20 into the mouth of the respective feed train 38, 40, the mouth defined between the butt lifter and the first feed roller 68 of the upper rank 70 of the respective feed train 38, 40. The butt lifter comprises a number of bars (e.g., four) spaced evenly about and mounted to the two drums (e.g., welded).

With respect to the other feed rollers 68 of the lower rank 72 of the first and second feed trains 38, 40, the feed rollers 68 taper along their respective axes of rotation 74 in laterally opposite directions relative to the fore-aft axis 14 to guide the respective mat of sugarcane to the third feed train 42. Each of the second and third feed rollers 68 (the two intermediate feed rollers 68 between the butt lifter and the fourth feed roller 68) tapers along its axis of rotation 74 laterally inwardly relative to the fore-aft axis 74. The fourth feed roller 68 is positioned downstream from the butt lifter and the second and third feed rollers 68 in the respective feed direction 45, 46 and tapers along its axis of rotation 74 laterally outwardly relative to the fore-aft axis.

Such tapering is achieved, for example, by the tooth height profile of the respective feed roller 68 of the lower rank 72 of the first and second feed trains 38, 40. Each feed roller 68 comprises a number of mounting plates mounted to the two drums 44 (e.g., welded). In an example, each feed roller 68 comprises a first mounting plate, a second mounting plate, and a third mounting plate, the second and third mounting plates similar to one another in configuration and smaller than the first mounting plate. The first, second, and third mounting plates are spaced circumferentially evenly about the two drums and the axis 74. The first mounting plate comprises along its midline three slots arranged along the axis 42 of the feed roller 68. Each of the second and third mounting plates comprises three tabs, each of which is received in a respective one of the slots, such that each of the second and third mounting plates is fixed to the first mounting plate (and one another) between the two drums (e.g., welded with tab-and-slot joints). The feed roller 68 also comprises a number of axial rows of teeth (e.g., four), each row of teeth formed as a linear plate of teeth mounted (e.g., bolted) to the first, second, or third mounting plate. Two of the axial rows of teeth are mounted to diametrically opposite sides of the first mounting plate, and the other two axial rows of teeth are mounted respectively to the second mounting plate and the third mounting plate. The tooth height profile of the second and third feed rollers 68 tapers along the respective axis of rotation 74 laterally inwardly relative to the fore-aft axis 14, and the tooth height profile of the fourth feed roller 68 tapers along the respective axis of rotation 74 laterally outwardly relative to the fore-aft axis 14. Each axial row of teeth is configured to have the tooth height profile of the respective feed roller 68.

With respect to the second, third, and fourth feed rollers 68 of the lower rank 72 of the third feed train 42, the feed rollers 68 are similar to one another in configuration. Each feed roller 68 comprises two coaxial drums 44 spaced along the respective axis 74 so as to be positioned at opposite end portions of the feed roller 68, and comprises a number of axial rows of teeth (e.g., four) spaced circumferentially evenly about the two drums, each row of teeth included in a linear plate mounted to the two drums (e.g., welded). In an example, each feed roller 68 comprises a first linear plate comprising two diametrically opposite axial rows of teeth, a second linear plate comprising an axial row of teeth, and a third linear plate comprising an axial row of teeth diametrically opposite to the axial row of teeth of the second linear plate. The first linear plate comprises along its midline three slots arranged along the axis 74 of the feed roller 68. Each of the second and third plates comprises three tabs, each of which is received in a respective one of the slots, such that each of the second and third linear plates is fixed to the first linear plate (and one another) between the drums (e.g., welded with tab-and-slot joints). The tooth height profile of each feed roller 68 is uniform. Each axial row of teeth is configured to have the uniform tooth height profile.

Referring to FIG. 6, the lower rank 70 of the third feed train 42 comprises a number of vanes. With respect to the first feed roller 68, an annular vane is aligned with the fore-aft axis 14, each linear plate of teeth of that feed roller 68 passing through a respective slot in the vane such that the vane is centrally mounted to the feed roller 68 (e.g., welded to the drum and the linear plates of teeth at the slots). That vane helps to spread the sugarcane laterally relative to the fore-aft axis 14 by preventing bunching of the mats, and may help to guide the sugarcane from the third feed train 42 back to the first and second feed trains 38, 40 during a reverse operation (e.g., in the case of a stall).

With respect to the second feed roller 68 of the third feed train, there are a first pair of semi-circular vanes mounted (e.g., welded) to a first side of the first linear plate and a second pair of semi-circular vanes mounted (e.g., welded) to an opposite second side of the first linear plate. The second linear plate passes through and is coupled (e.g., welded) to a slot in the vanes of the first pair, and the third linear plate passes through and is coupled (e.g., welded) to a slot in the vanes of the second pair. Each vane has two tabs that fit within and are mounted (e.g., welded) to a respective slot in the first linear plate. The vanes of the second feed roller 68 are angled relative to the fore-aft axis 14. The vanes of the third feed roller 68 of the third feed train 42 are similar to the vanes of the second feed roller 68 of the third feed train 42, except that the vanes of the third feed roller 68 are angled so as to have an opposite sense to that of the vanes of the second feed roller 68. The vanes of the second and third feed rollers 68 help to spread the sugarcane laterally relative to the fore-aft axis 14.

The harvester 10 and its feed section 26 may be configured for use with two or more rows 12 of sugarcane. While the feed section 26 of the illustrated embodiment is configured for use with two rows 12, it is to be understood that that this is a non-limiting example of a multi-row feed section for a multi-row sugarcane harvester. The feed section 26 may comprise one or more additional feed trains for one or more additional rows 12. For example, the feed section 26 may comprise a fourth feed train configured for use with a third row 12 and positioned laterally between the first and second feed trains 38, 40, such that the first and second feed trains 38, 40 and the fourth feed train merge into the third feed train 42 (with the first, second, and third feed trains 38, 40, 42 modified accordingly).

Welds and threads are not shown in the drawings for ease of illustration, but their presence is to be understood.

While the disclosure has been illustrated and described in detail in the drawings and foregoing description, such illustration and description is to be considered as an example and not restrictive in character, it being understood that an illustrative embodiment has been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A multi-row sugarcane harvester for harvesting a first row of sugarcane and a second row of sugarcane simultaneously, the multi-row sugarcane harvester having a fore-aft axis, the multi-row sugarcane harvester comprising
    a first basecutter configured to sever a first mat of sugarcane from the first row of sugarcane,
    a second basecutter configured to sever a second mat of sugarcane from the second row of sugarcane,
    a first feed train comprising a first mouth positioned downstream from the first basecutter to receive the first mat of sugarcane therefrom into the first feed train, the first feed train configured to advance the first mat of sugarcane,
    a second feed train comprising a second mouth separate from the first mouth and positioned downstream from the second basecutter to receive the second mat of sugarcane therefrom into the second feed train, the second feed train configured to advance the second mat of sugarcane, and
    a third feed train, the first and second feed trains merging into the third feed train, the third feed train configured to advance the first and second mats received respectively from the first and second feed trains, each of the first feed train and the second feed train comprising a first feed roller and a second feed roller, each of the first and second feed rollers having an axis of rotation with a lateral component relative to the fore-aft axis, wherein, with respect to the first feed train, the axes of rotation of the first and second feed rollers are positioned at different acute angles relative to the fore-aft axis.

2. The multi-row sugarcane harvester of claim 1, wherein the first feed train and the second feed train are symmetrical relative to the fore-aft axis.

3. The multi-row sugarcane harvester of claim 1, wherein, with respect to the second feed train, the axes of rotation of the first and second feed rollers are positioned at different acute angles relative to the fore-aft axis.

4. The multi-row sugarcane harvester of claim 1, wherein the first feed train comprises another feed roller, and, with respect to the first feed train: the first and second feed rollers are positioned downstream from the other feed roller relative to a feed direction toward the third feed train, and the axes of rotation of the first and second feed rollers are progressively acutely angled relative to the fore-aft axis in the feed direction.

5. The feed section of claim 4, wherein the second feed train comprises another feed roller, and, with respect to the second feed train: the first and second feed rollers are positioned downstream from the other feed roller relative to a feed direction toward the third feed train, and the axes of rotation of the first and second feed rollers are progressively acutely angled relative to the fore-aft axis in the feed direction.

6. The multi-row sugarcane harvester of claim 1, wherein, with respect to each of the first feed train and the second feed train: the axis of rotation of the first feed roller forms an acute angle relative to the fore-aft axis, and the axis of rotation of the second feed roller is positioned downstream from the first feed roller in a feed direction toward the third feed train and forms a more acute angle relative to the fore-aft axis.

7. The multi-row sugarcane harvester of claim 1, wherein the third feed train comprises a feed roller that is positioned immediately adjacent to a junction at which the first and second feed trains merge into the third feed train and radially bulges axially centrally relative to an axis of rotation of that feed roller.

8. The multi-row sugarcane harvester of claim 1, wherein the multi-row sugarcane harvester has a centerline coincident with the fore-aft axis.

9. A feed section for a multi-row sugarcane harvester configured to harvest a first row of sugarcane and a second row of sugarcane simultaneously, the feed section comprising a first feed train configured to advance a first mat of sugarcane received from the first row of sugarcane, a second feed train configured to advance a second mat of sugarcane received from the second row of sugarcane, and a third feed train, the first and second feed trains merging into the third feed train, the third feed train configured to advance the first and second mats received respectively from the first and second feed trains, each of the first feed train and the second feed train comprising a first feed roller and a second feed roller, each of the first and second feed rollers having an axis of rotation, wherein, with respect to the first feed train, the axes of rotation of the first and second feed rollers are positioned at different acute angles relative to a fore-aft axis of the feed section, wherein, with respect to each of the first feed train and the second feed train: the axis of rotation of the first feed roller forms an acute angle relative to the fore-aft axis, and the axis of rotation of the second feed roller is positioned downstream from the first feed roller in a feed direction toward the third feed train and forms a more acute angle relative to the fore-aft axis, and the first and second feed rollers taper along their respective axes of rotation in laterally opposite directions relative to the fore-aft axis.

10. The feed section of claim 9, wherein, with respect to each of the first and second feed trains: the first feed roller tapers along its axis of rotation laterally inwardly relative to the fore-aft axis, and the second feed roller is positioned downstream from the first feed roller in a feed direction toward the third feed train and tapers along its axis of rotation laterally outwardly relative to the fore-aft axis.

11. The feed section of claim 9, wherein each of the first and second feed trains comprises an upper rank of feed rollers and a lower rank of feed rollers, and, with respect to each of the first and second feed trains, the lower rank of feed rollers comprises the first and second feed rollers.

12. A feed section for a multi-row sugarcane harvester configured to harvest a first row of sugarcane and a second row of sugarcane simultaneously, the feed section comprising a first feed train configured to advance a first mat of sugarcane received from the first row of sugarcane, a second feed train configured to advance a second mat of sugarcane received from the second row of sugarcane, and a third feed train, the first and second feed trains merging into the third feed train, the third feed train configured to advance the first and second mats received respectively from the first and second feed trains, each of the first feed train and the second feed train comprising a first feed roller and a second feed roller, each of the first and second feed rollers having an axis of rotation, wherein, with respect to the first feed train, the axes of rotation of the first and second feed rollers are positioned at different acute angles relative to a fore-aft axis of the feed section, wherein, with respect to the first feed train: the first feed roller tapers along its axis of rotation laterally inwardly relative to the fore-aft axis, and the second feed roller is positioned downstream from the first feed roller in a feed direction toward the third feed train and tapers along its axis of rotation laterally outwardly relative to the fore-aft axis.

* * * * *